United States Patent
Bauer et al.

[11] Patent Number: 6,138,551
[45] Date of Patent: Oct. 31, 2000

[54] FILTER DEVICE

[76] Inventors: Jürgen Bauer, Hofaue 30, D-42103 Wuppertal, Germany; Roswitha Mekelburg, Braunschweigstrasse 3, D-42389 Wuppertal, Germany

[21] Appl. No.: 09/171,923

[22] PCT Filed: Apr. 25, 1997

[86] PCT No.: PCT/EP97/02139

§ 371 Date: Oct. 26, 1998

§ 102(e) Date: Oct. 26, 1998

[87] PCT Pub. No.: WO97/40727

PCT Pub. Date: Nov. 6, 1997

[30] Foreign Application Priority Data

Apr. 26, 1996 [DE] Germany ............................ 196 16 631
Jan. 1, 1997 [DE] Germany ............................ 197 00 005

[51] Int. Cl.[7] .............................. A47J 31/06; A47J 31/02
[52] U.S. Cl. .............................. 99/323; 99/321; 99/322; 99/306; 426/82
[58] Field of Search .............................. 99/323, 304, 306, 99/322, 279, 321; 426/77, 82, 83; 210/314, 474, 475, 476

[56] References Cited

U.S. PATENT DOCUMENTS

| 486,848 | 5/1978 | Hahn ..................................... 99/323 |
| 3,971,305 | 7/1976 | Daswick ................................ 99/295 |

FOREIGN PATENT DOCUMENTS

| 277500 | 4/1998 | Belgium . |
| 1207866 | 5/1964 | European Pat. Off. . |
| 0020093 | 12/1980 | European Pat. Off. . |
| 0290801 | 11/1988 | European Pat. Off. . |
| 0401951 | 12/1990 | European Pat. Off. . |
| 0460383 | 12/1991 | European Pat. Off. . |
| 0741988 | 12/1994 | European Pat. Off. . |
| 2200616 | 6/1973 | Germany . |
| 2657498 | 6/1978 | Germany . |
| 812396 | 8/1981 | Germany . |
| 8210584 | 9/1982 | Germany . |
| 3413654 | 10/1985 | Germany . |
| 91044839 | 9/1992 | Germany . |
| 91048974 | 11/1992 | Germany . |
| 9107129 | 11/1992 | Germany . |
| 479281 | 7/1968 | Switzerland . |
| 1436397 | 12/1972 | United Kingdom . |
| 2120951 | 12/1983 | United Kingdom . |

*Primary Examiner*—Reginald L. Alexander
*Attorney, Agent, or Firm*—Robert W. Becker & Associates

[57] ABSTRACT

A filter device for brewing beverages from coffee or tea grounds has a support frame comprising a first annular member and at least two radially outwardly projecting supports for placing the filter device onto a rim of a beverage container. The first annular member has a diameter smaller than the diameter of the beverage container. A disposable filter insert enclosing an amount of coffee grounds or tea leaves for brewing a beverage in the beverage container is provided. The filter insert has a seamless conical porous pocket for receiving the coffee grounds or tea leaves. The conical pocket has a cone base facing upwardly and a cone top facing downwardly. The filter insert also has a porous cover covering an opening at cone base. The pocket has finer pores than the cover. The cover sags downwardly and forms a depression. The pocket is folded from a flat sheet, having an oval or circular contour, by folding in opposite folding directions along at least two folding lines extending diametrically through the flat sheet and positioned at an angle of up to 45° to one another. The folding lines are secured against unfolding without using an adhesive by connecting at least the edges of the pocket and the cover to one another. The filter insert is annularly supported at the cone base by the annular member of the support frame such that the pocket is freely suspended from the support frame.

17 Claims, 4 Drawing Sheets

FILTER DEVICE

BACKGROUND OF THE INVENTION

The present invention relates to a filter device for brewing a beverage.

For this purpose it is known to place coffee grounds or tea grounds (tea leaves) into a coffee filter/tea filter which is positioned in a filter support device. The filter support device is open in the direction to the container positioned below. The ground material is then brewed with boiling water and can expand. Especially in the case of making tea, the water poured onto the grounds is not allowed to drain so that the ground material can steep.

These measures serve the purpose of extracting the flavor compounds from the ground material and washing them out.

The advantage of this method is that it can be used for coffee as well as tea.

Furthermore it is known to introduce the tea grounds into a so-called tea bag. The tea bag is then placed over the rim of the container. The ground tea can then be steeped in boiled water. Subsequently, the tea bag is removed and thrown away.

A problem in this context are bitter compounds which, when the tea is allowed to steep for too long, are extracted from the tea and are then found in the beverage. A further problem is that this method is only suitable for making tea.

It is therefore an object of the present invention to improve a filter device of the aforementioned kind such that the brewed beverage can be produced even in small portions in a simplified manner.

SUMMARY OF THE INVENTION

The invention has the advantage that, independent of the required amount of beverage, the flavor compounds are extracted from the coffee or the tea while the bitter compounds are retained.

The inventive filter device allows to take advantage of the advantages of the filter method for small portions without the disadvantages of known methods for small portions (tea bags).

This advantage is realized in that, on the one hand, the filter device encloses tightly a pre-portioned amount of the ground material from all sides and that, on the other hand, this pre-portioned amount of ground material is filtered according to the well-known brewing method. Thus, the bitter compounds are retained while at the same time the flavoring compounds are extracted. Thus, the combination of the filter method with pre-portioned amounts of ground material is an important aspect.

Due to the small amounts of ground material required for a beverage container, the filter method can be performed with support frames which have no support wall for the filter material. The filter material is thus freely suspended. It was found that commercially available filter paper has sufficient stability and stiffness in order to fulfill the required specifications in regard to stability. The known filter materials can thus be preformed/pretailored such that they can be freely suspended from the support frame. The practically freely suspended arrangement of the filter insert at the support frame allows the brewed extract to exit also laterally from the filter insert in order to drip into the beverage container arranged below. It is not required that the brewed extract percolates through the entire amount of ground material in the filter insert. Especially the border areas of the ground material are thus extracted directly after being exposed to boiling water and the extract is directly introduced into the beverage container.

A further important aspect is that almost the entire surface area of the filter insert is contact-free with regard to the support frame even though the support frame provides the required securing action for the filter insert.

The support frame can have annular circumferential zones that are only a few millimeters wide in which the filter insert is suspended or to which the filter insert is hot-sealed without adhesive. The annular frame can furthermore be embodied in the shape of a basket of at least two circumferential annular members which are connected to one another by upwardly extending stays (for example, three to six stays). In all cases, by taking advantage of the inherent stability and breakage stability of the filter insert material, a sufficiently large surface area for passage of the extract is provided outside of the contact locations between the filter insert and the support frame.

Especially for basket-shaped support frames correspondingly thinner materials can be used for the filter insert.

Since the filter insert has its largest cross-sectional area at the upper end and tapers from this point continuously to its lower end, the filter insert is thus protected against rupture or slipping out of the frame. By employing at least two circumferential annular members, an upper ring and a lower ring, which are connected by connecting stays this effect can be further improved.

The invention refers basically to two embodiments. On the one hand, it is possible to provide the filter insert independent of the support frame. In this case, the filter insert is placed separately onto the support frame for each beverage portion to be brewed.

On the other hand, the filter insert can be connected to the support frame. In this case, each beverage portion requires a filter device including the support frame.

Advantageously, the filter insert is provided for an annular support frame which has a plurality of outwardly extending supports. The supports are preferably uniformly distributed about the circumference and are placed onto the rim of the beverage container before the beverage is brewed. On the basket-shaped embodiment of the support frame, the supports can be connected to the upper annular member or the connecting stays or the lower annular member.

By eliminating externally arranged support walls, the filter device can be suspended, depending on the arrangement of the supports, to a greater or lesser degree into the beverage container. Since the height of the filter device according to the invention is only a few centimeters, the brewing process is not disrupted. The brewed beverage will reliably flow into the beverage container.

In order to be able to pour a larger amount of water, the frame ring or the upper annular member can have a cylindrical or conical extension that is liquid-tight and is preferably a unitary part of the support frame produced by injection molding of plastic material. This embodiment is shown in FIG. 2 in dashed lines.

By using filter paper of the conventional type, a sufficiently fine-pored filter material is provided. When the pocket made of filter material is covered by a cover material that has larger pores, the water during brewing can be quickly poured into the pocket containing the ground material without running the risk that the poured water will flow laterally across the beverage container rim.

In addition, it is suggested that the cover material with larger pores sags slightly in the downward direction in order to counter a back flow effect of the brewing water.

An advantageous material for the filter material is filter paper, an advantageous material for the cover of the filter device is a nonwoven material having large pores whereby the edges are connected fixedly to one another by crimping without employing an adhesive.

As a simple method for manufacturing the filter device it is suggested to fold the filter material having a circular contour along at least two diametric lines in the opposite direction. The diametric lines have an angle of approximately up to 30° to one another. Pairs of such oppositely folded diametric lines can be provided to produce a filter device that has a small diameter and is seamless. The folds can be secured against unfolding by connecting the edges of the pocket and of the cover material. In addition, the folds can be crimped in the direction toward the top of the cone over portions or their entire length in order to prevent unfolding.

When the contour of the filter material is substantially oval, the diametric lines along the large axis of the oval end at a spacing to one another so that a filter insert with a substantially truncated cone shape is produced.

The more and more stringent requirements with regards to recyclable disposable materials have resulted in a further embodiment in which the support frame is comprised of a water-resistant but recyclable material. For this purpose wire, plastic, or hot water-resistant cardboard is especially useful.

BRIEF DESCRIPTION OF THE DRAWINGS

In the following the invention will be explained in more detail with the aid of exemplary embodiments. It is shown in.

DESCRIPTION OF PREFERRED EMBODIMENTS

Figure 1:
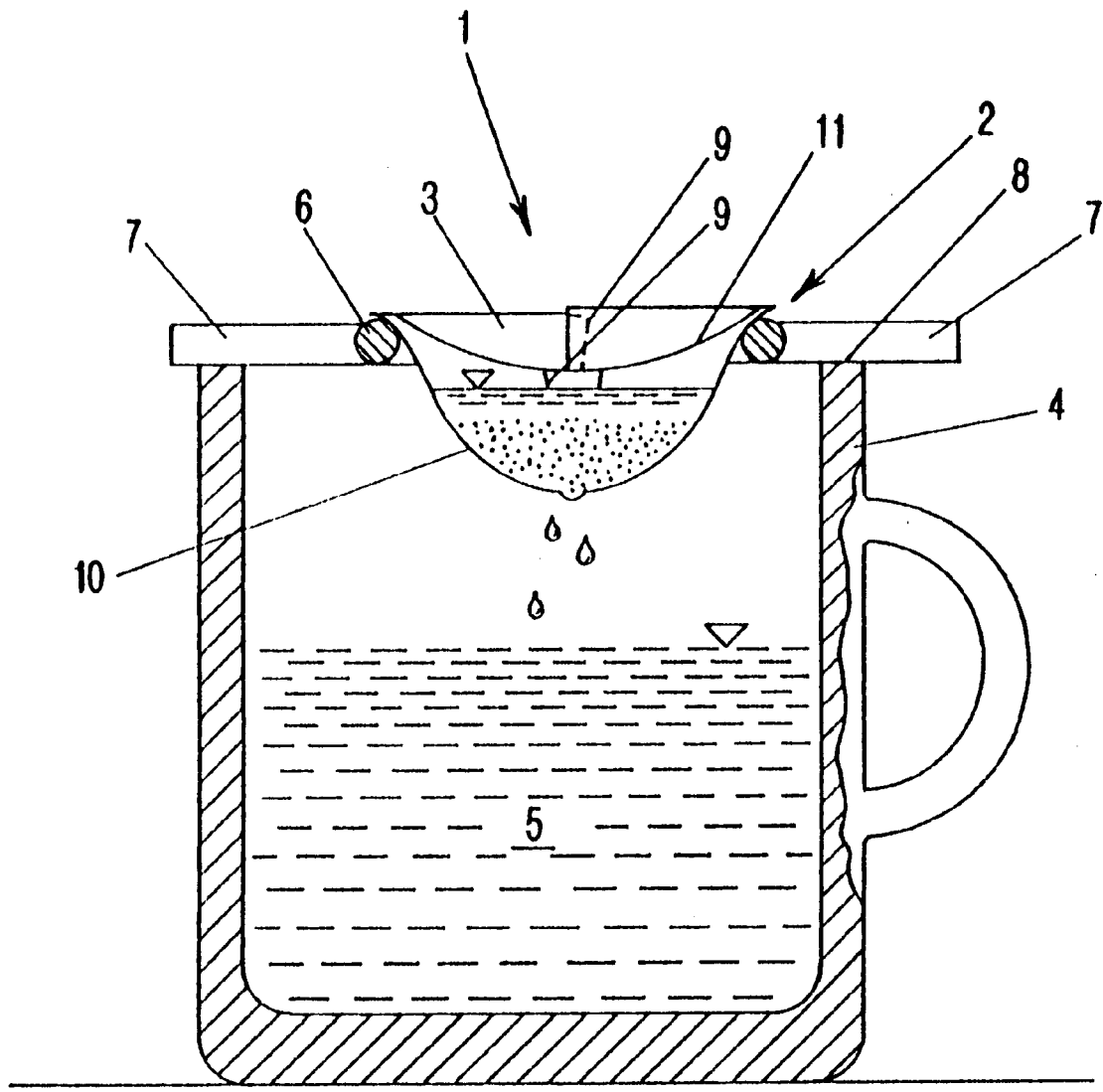
FIG. 1 a first embodiment of the invention in a sectional sideview.

If no particular reference is made, the following description holds true for all Figures.

The Figures show a filter device 1 for brewing a beverage of ground material of coffee or tea.

For this purpose, a support frame 2 is provided which is placed onto a container. The support frame 2 supports a filter insert 3. The filter insert 3 encloses a pre-portioned amount of ground material. The amount is pre-portioned for use with a conventional beverage container 4. The ground material is enclosed from all sides. For this purpose, the filter insert 3 has a pocket 10 that is freely suspended in the downward direction and contains ground material. The pocket 10 is air and water permeable but is impermeable for the ground material. In the upward direction, the pocket 10 is closed by a suitable cover material 11. The cover material 11 as well as the pocket 10 are air permeable and water permeable but tight with respect to the ground material.

It is important that the pocket 10 at its upper end has the greatest cross-sectional area and tapers continuously from there to its lower end. The pocket 10 thus has a funnel-shaped or spherical cup-shaped or cone-shaped contour. The sidewalls of the pocket 10 extend at a slant from the upper end to the lower end. In this manner the extracted liquid can flow also laterally out of the pocket. The extracted liquid passing through the filter insert is thus already directed into the beverage container at the upper end of the ground material portion. It is further important that the support frame 2 is described at the inside by an envelope which in the circumferential direction contacts annularly the greatest cross-sectional area of the filter insert. This practically forces a supporting action for the filter insert 3 by the support frame 2. In principle, it is sufficient, as is shown in FIG. 1, to provide only a single annular member 6 which is arranged directly below the greatest cross-sectional area of the filter insert 3. Thus, only the very narrow annular contact location between the support frame 2 and filter insert 3 is provided while an extremely large proportion of free surface area is available for passage of the brewed extract.

Figure 2:
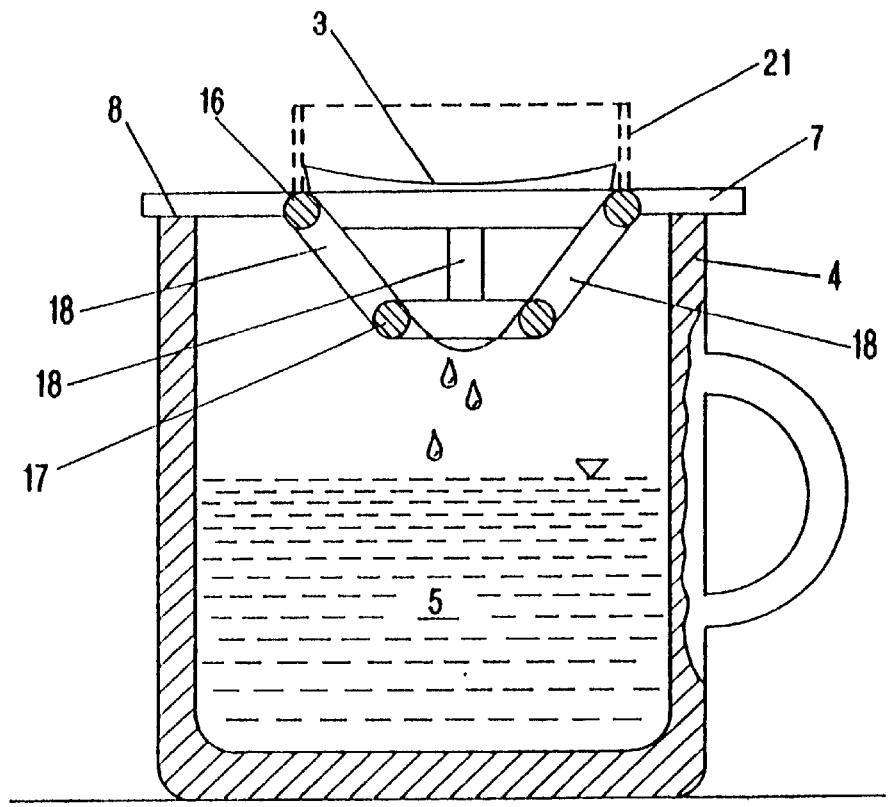
FIG. 2 a further embodiment of the invention.

FIG. 2, on the other hand, shows an embodiment in which the support frame has an upper and a lower annular member 16, 17 whereby the upper annular member 16 and the lower annular member 17 are connected by upwardly extending connecting stays 18 to form a basket shape. In this manner, a relatively large free cross-sectional area for passage of the extract is produced while the contact locations between the filter insert 3 and the support frame 2 provide for a circumferential support of the filter insert 3. The supports 7 may also be arranged at the connecting stays 18 or at the lower annular member 17 so that the filter insert 3 does not extend that far into the beverage container 4.

Figure 2A:
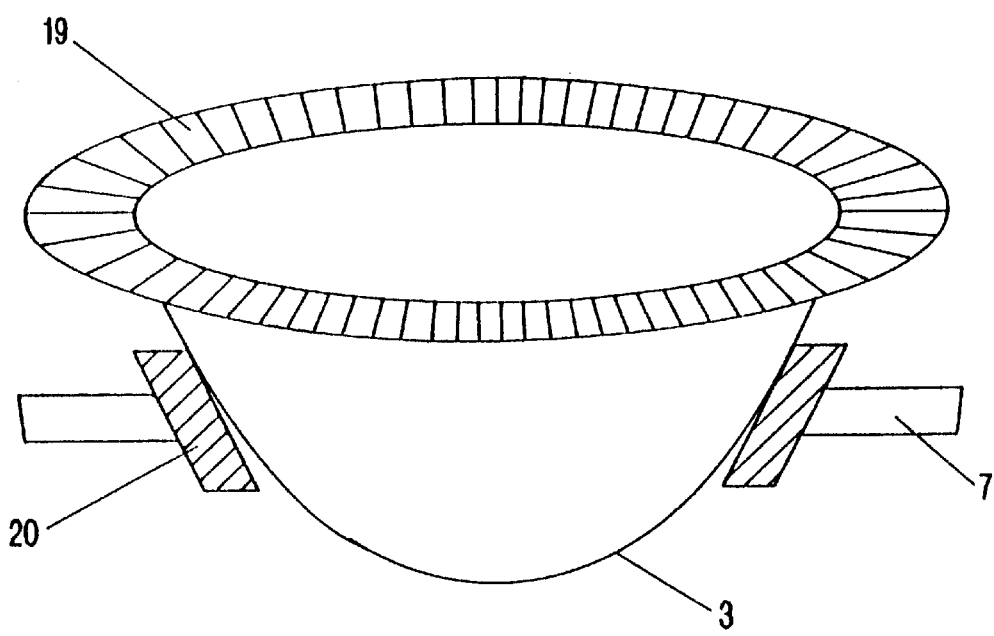
FIG. 2a a further embodiment of the invention.

FIG. 2a shows a further embodiment of the invention. Here, only a single annular member 20 is provided which in the manner of a truncated cone receives a correspondingly shaped filter insert 3. The upper edge of the filter insert 3 is connected with the cover material 11 by a crimp connection 19. This provides a certain stiffness with regard to folding of the upper end so that the filter insert suspended from the truncated cone is reliably supported during the brewing process. In this embodiment the supports 7 are arranged at half the height of the truncated cone 20.

When using the disclosed filter device the support frame 2 is placed onto a mug/a cup for each beverage portion to be brewed. The mug/the cup is referred to as beverage container 4. The support frame 2 is placed onto the rim 8 of the beverage container 4 and subsequently the ground material 25 in the pocket 10 is brewed.

It is important that the support frame 2 is embodied continuously in the circumferential direction as well as from top to bottom without support wall and that each filter insert 3 is freely suspended at the support frame 2.

The embodiment according to FIG. 1 shows that the filter insert 3 is fixedly connected, for example, by hot sealing, without employing an adhesive, to the respective support frame 2. Accordingly, for each beverage portion 35 to be brewed a filter device 1 is required. However, it is also possible to produce the filter device 1 so as to have a separate filter insert 3 and a separate support frame 2. In this case, a respective filter insert 3 for each beverage portion to be brewed is to be suspended from the support frame 2 (see, for example, FIG. 2).

In the case of FIG. 1, the filter insert 3 is provided for an annular support frame 2. The annular support frame 2 has, three radially outwardly extending supports 7 which are placed onto the rim 8 of the beverage container so that the filter insert 3 can be freely suspended into the beverage container 4 and is spaced from the liquid level of the beverage.

Since the filter insert 3 projects into the mug/the cup, the filtered beverage can only flow into the beverage container 4. The diameter of the filter device 1 is substantially smaller than the diameter of conventional beverage containers 4 so that when the beverage is brewed laterally overflowing water will also run into the beverage container 4.

As is shown in FIGS. 1 and 2, the filter device 1 has a suspended pocket 10 comprised of a filter material with fine pores. Conventional filter paper can be used for this purpose. The pocket 10 is covered in the upper direction by a cover material 11 having larger pores and is tightly closed. In the space defined thereby the ground material of coffee or tea is contained.

As can be seen especially in FIG. 1, the upper cover material 11 is so generously dimensioned that it sags in the downward direction. When pouring water, above the cover material 11 a collecting space is provided before the water will flow laterally across the annular members 6.

While the filter material can be conventional filter paper, it is additionally suggested that the cover material 11 is made of a nonwoven material. For this purpose, a nonwoven material has been proven successful that has large pores and is comprised of long fibers, comparable to the nonwoven material of which conventional tea bags are manufactured. The edges of the pocket 10 made of filter paper and of the cover material 11 made of nonwoven material can be connected to one another tightly by crimping without using an adhesive.

Figure 3A:
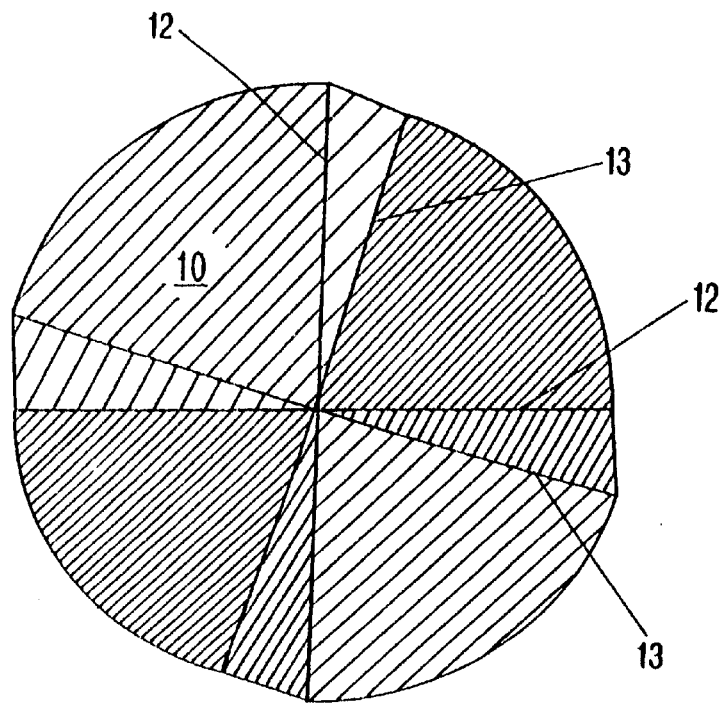
FIGS. 3a, 3b a respective cutout for producing the filter device according to FIGS. 1–2.
Figure 3B:
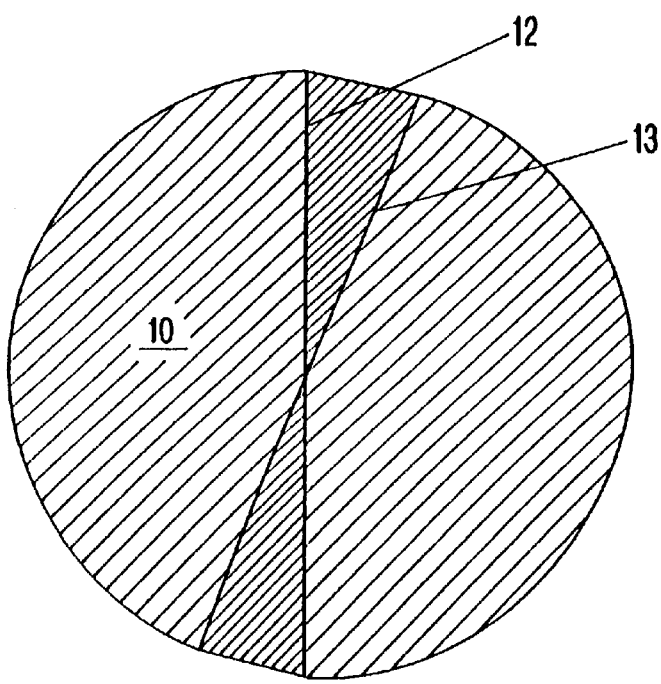

Furthermore, FIGS. 3a, 3b illustrate how a filter insert 3 can be easily produced. For this purpose, it is suggested that the filter material has a circular contour and is folded along at least two diametric lines 12, 13 in opposite directions. A further diametric line pair can be provided according to FIG. 3a. The diametric line pairs are positioned respectively at an angle of up to approximately 30° to one another. Each diametric line forms a folding line 9. By folding the filter material along the predetermined folding lines 9 in opposite directions, the filter material having a circular contour is formed into a seamless, conical hollow shape that can be easily fastened according to FIGS. 1 and 2 to the respective annular member 6 before the ground material of coffee or tea is introduced. Subsequently, the cover material 12 is applied thereto.

The folds can be secured against unfolding by connecting the edges of the pocket 10 and of the cover material 11. In addition, the folds can be secured in the direction toward the top of the cone over portions thereof or over the entire length by crimping so that the filter insert 3 during the brewing process of the ground material will not bulge or deform under the weight of the water. Due to the seamless embodiment of the filter material for the filter insert 3, despite its free suspension at the support frame 2, the ground material is secured against spilling out of the insert even when the folds will open.

Figure 4:
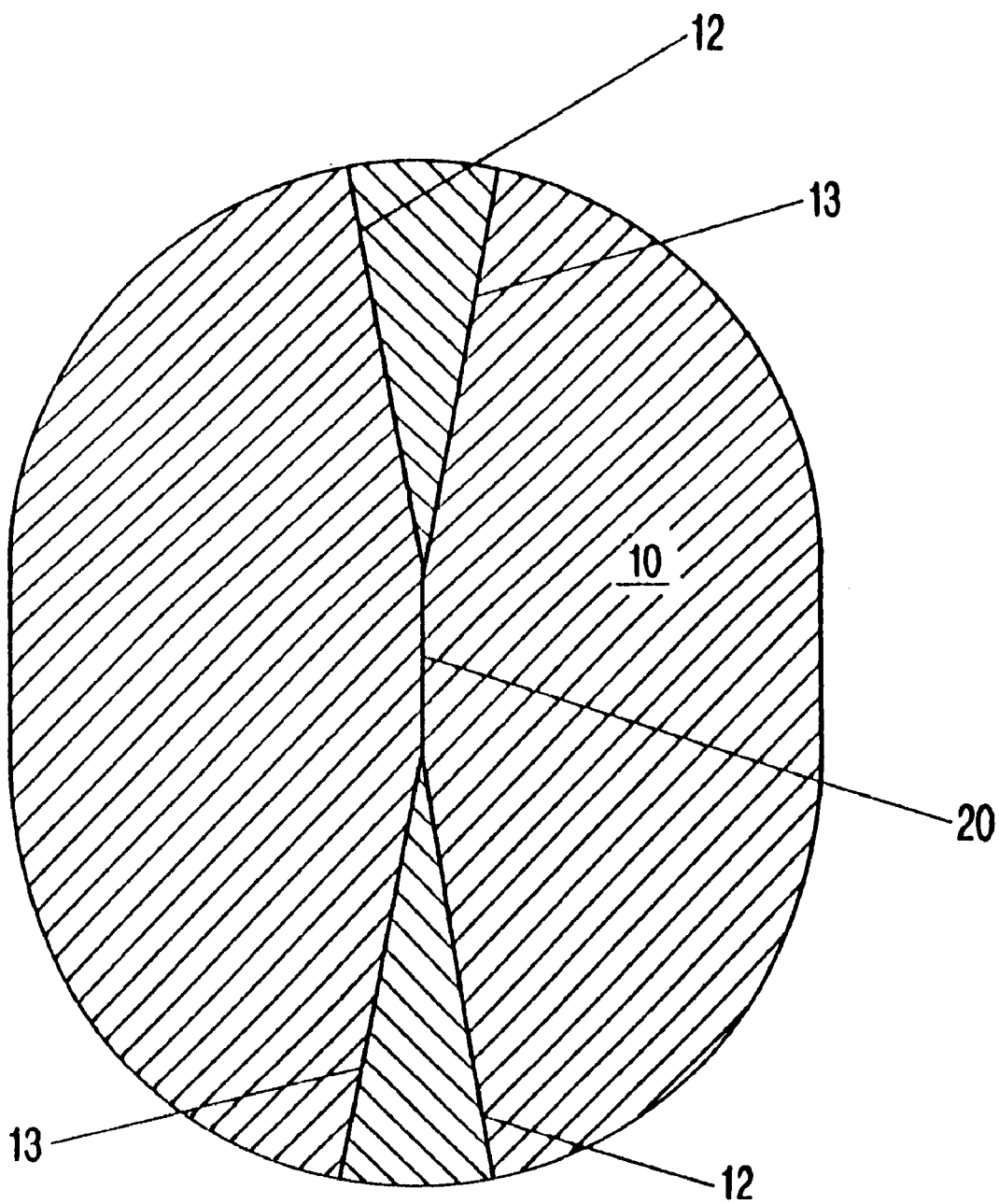
FIG. 4 a further embodiment of a cutout.

When the cutout of the filter material, as shown in FIG. 4, has a substantially oval contour and the diametric lines 12, 13 along the long axis are positioned at a spacing 22 to one another, a filter insert with substantially truncated cone shape can be produced.

The size of the filter insert 3 is matched, on the one hand, to the amount of ground material required for a beverage container of conventional size. On the other hand, the expansion of the ground material during brewing must be taken into consideration. The depression which is formed by the cover material 11 should be so large that the expanded material cannot penetrate through the cover material 11 in the upward direction.

In any case, between the upper layer of the expanded ground material and the cover material 11 there should be provided a sufficient spacing in order to prevent the expanded ground material from penetrating the cover material 11.

In order to be able to pour a large amount of water, the annular member 6 or the annular member 16 may have a cylindrical or conical liquid-tight extension 21 which is a unitary part of the support frame 2 and is produced from plastic material by injection molding. This embodiment is shown in FIG. 2 in dashed lines.

The present invention is, of course, in no way restricted to the specific disclosure of the specification and drawings, but also encompasses any modifications within the scoop of the appended claims.

We claim:

1. A filter device (1) for brewing beverages (5) from coffee or tea grounds, said filter device comprising:

a support frame (2) comprising a first annular member (6, 16) and at least two radially outwardly projecting supports (7) for placing said filter device onto a rim of a beverage container;

said first annular member (6, 16) having a diameter smaller than a diameter of the beverage container;

a disposable filter insert (3) enclosing an amount of coffee grounds or tea leaves for brewing a beverage in the beverage container;

said filter insert (3) comprising a seamless conical porous pocket (10) for receiving the coffee grounds or tea leaves, said conical pocket having a cone base facing upwardly and a cone top facing downwardly said filter insert (3) further comprising a porous cover (11) covering an opening at said cone base;

said pocket (10) having finer pores than said cover (11);

said cover (11) sagging downwardly and forming a depression;

said pocket (10) being folded from a flat sheet, having an oval or circular contour, by folding said flat sheet in opposite folding directions along at least two folding lines (12, 13) extending diametrically through said flat sheet and positioned at an angle of up to 45° to one another;

said folding lines being secured against unfolding without using an adhesive by connecting at least the edges of said pocket (10) and said cover (11) to one another;

said filter insert (3) annularly supported at said cone base by said annular member of said support frame (2) such that said pocket (10) is freely suspended from said support frame (2).

2. A filter device according to claim 1, wherein said support frame (2) has a second annular member (17) arranged below said first annular member (16).

3. A filter device according to claim 2, wherein said at least two radially outwardly projecting supports (7) are connected to said second annular member (17).

4. A filter device according to claim 2, wherein said support frame (2) comprises connecting stays (18) connecting said first and said second annular members (16, 17).

5. A filter device according to claim 4, wherein said at least two radially outwardly projecting supports (7) are connected to said connecting stays (18).

6. A filter device according to claim 1, wherein said support frame has three of said radially outwardly projecting supports (7).

7. A filter device according to claim 1, wherein said at least two radially outwardly projecting supports are connected to said first annular member (6, 16).

8. A filter device according to claim 1, wherein said support frame (2) comprises an upward extension (21) connected to said first annular member (6, 16), said upward extension having a conical or cylindrical shape.

9. A filter device according to claim 1, wherein said pocket (10) and said cover (11) consist of a filter material.

10. A filter device according to claim 1, wherein said filter material is filter paper.

11. A filter device according to claim 1, wherein said cover (11) consists of large pore, long-fiber fleece material.

12. A filter device according to claim 1, wherein said edges of said pocket (10) and said cover (11) are connected to one another by crimping.

13. A filter device according to claim 1, wherein said angle between said folding lines (12, 13) is less than 30°.

14. A filter device according to claim 1, wherein said folding lines (12, 13) are secured against unfolding by crimping along an entire length of said folding lines (12, 13).

15. A filter device according to claim 1, wherein said flat sheet has an oval contour, having a long and a short axis, and wherein said folding lines (12, 13) extend in a direction of said long axis and end before a center point of said flat sheet such that said pocket (10) has a truncated cone shape.

16. A filter device according to claim 1, wherein said support frame (20 consists of a water-resistant recyclable material.

17. A filter device according to claim 1, wherein said support frame (2) is an injection-molded plastic part.

* * * * *